Oct. 21, 1958  H. P. KEIL  2,856,847
LIQUID PROCESS DUPLICATING MACHINE
Filed May 19, 1955  11 Sheets-Sheet 2
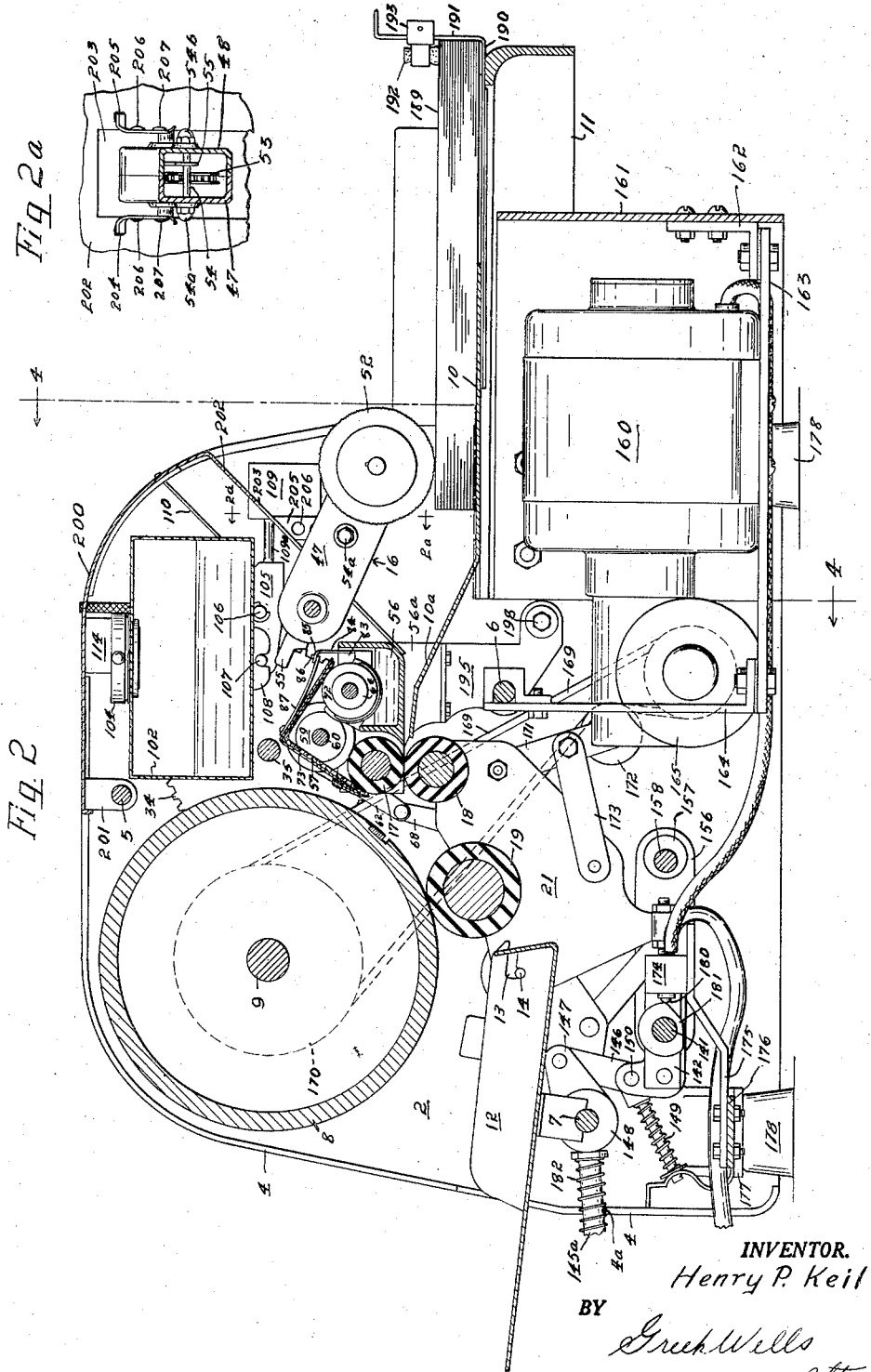
INVENTOR.
Henry P. Keil
BY
Grush Wells
atty.

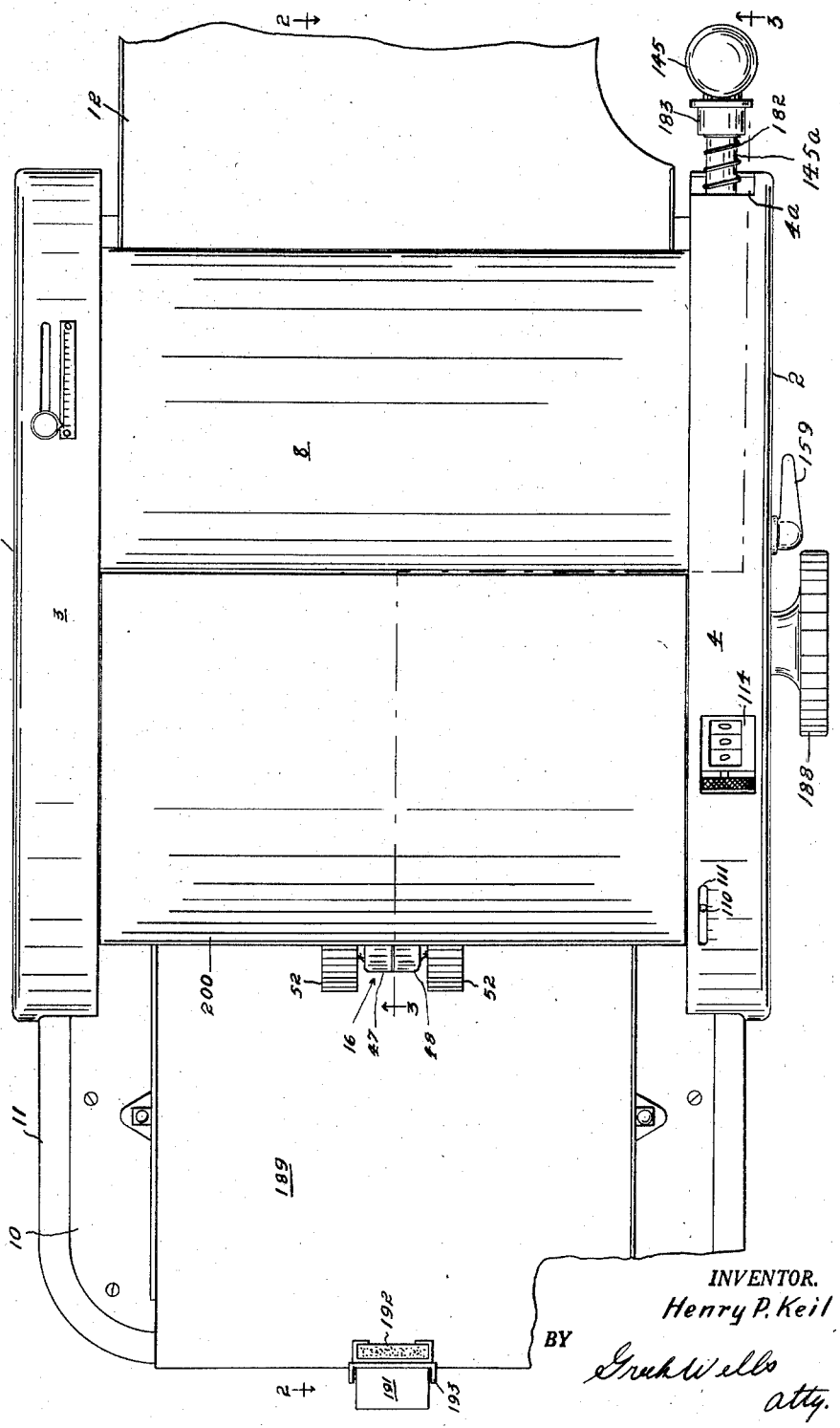

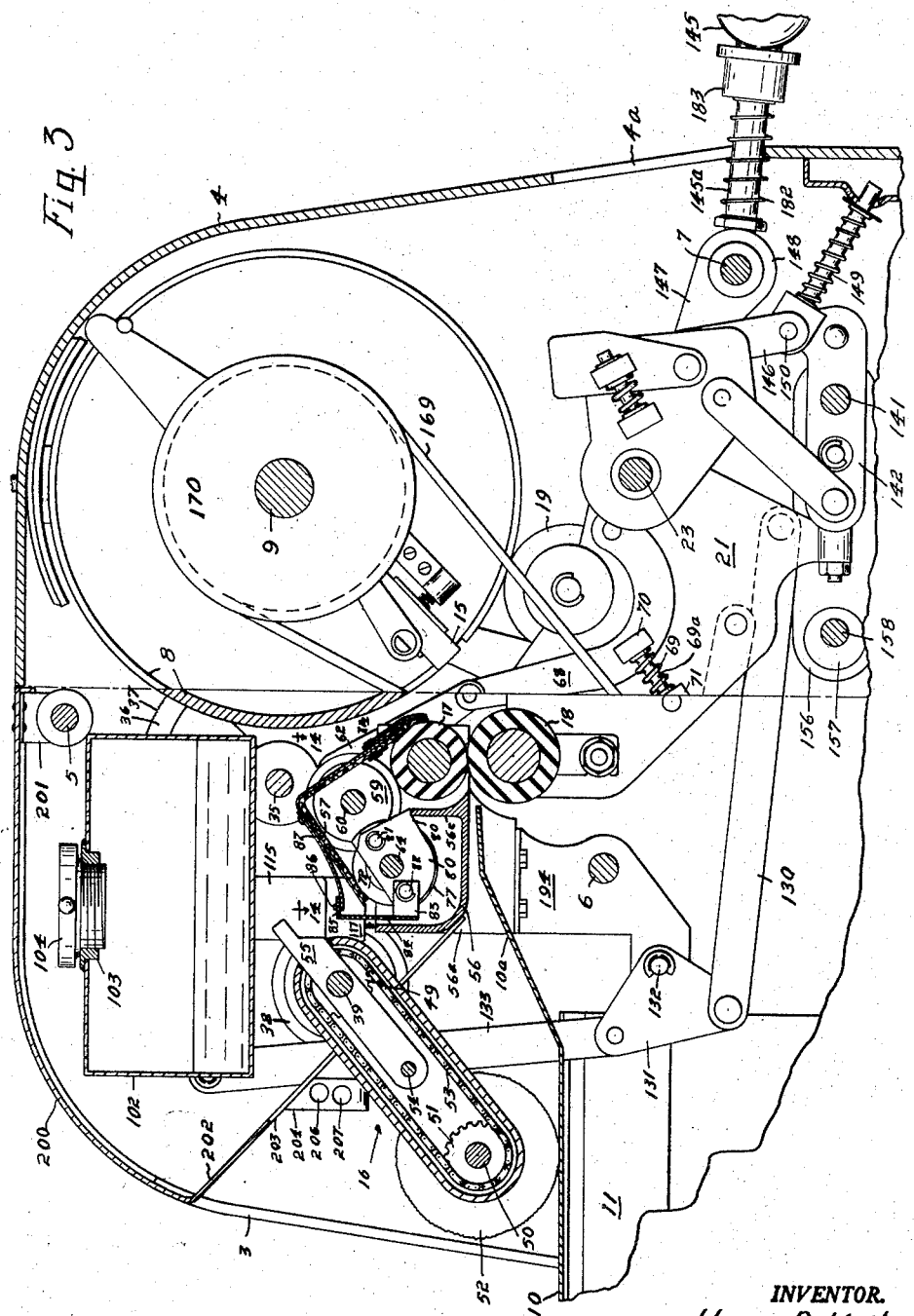

Oct. 21, 1958  H. P. KEIL  2,856,847
LIQUID PROCESS DUPLICATING MACHINE
Filed May 19, 1955  11 Sheets-Sheet 4
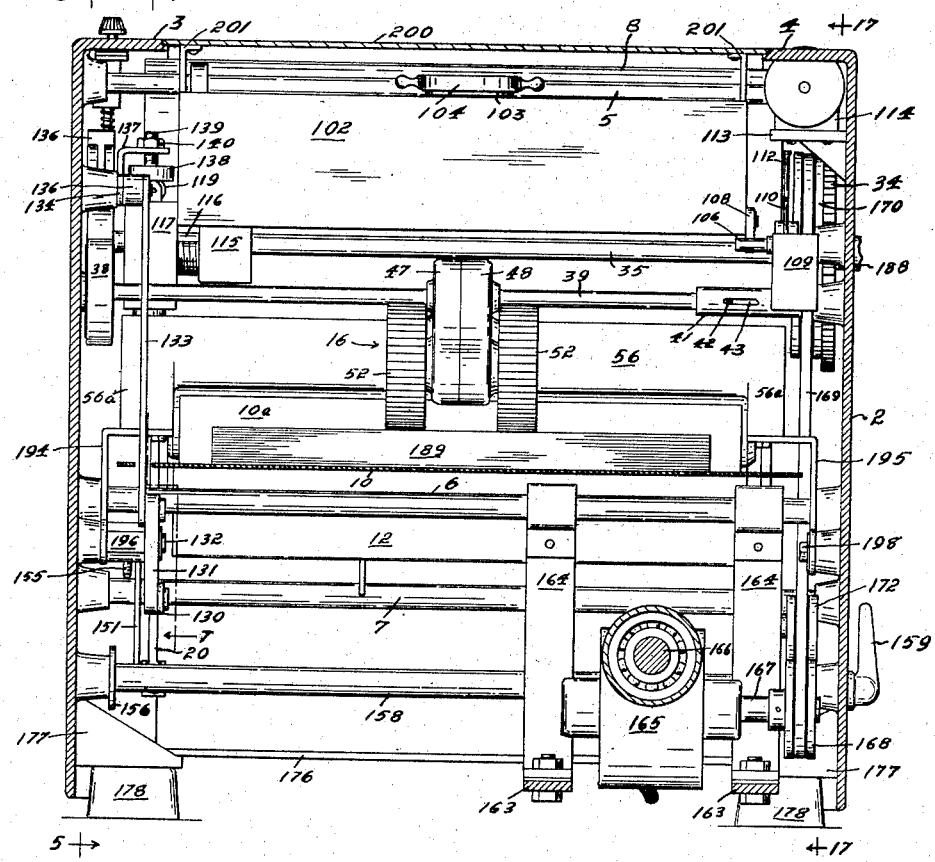
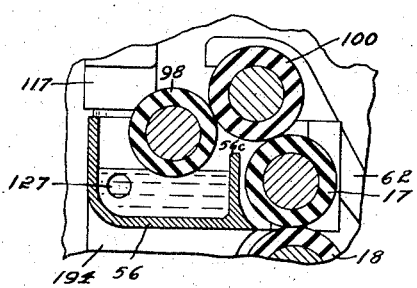
INVENTOR.
Henry P. Keil
BY Greek Wells
  atty

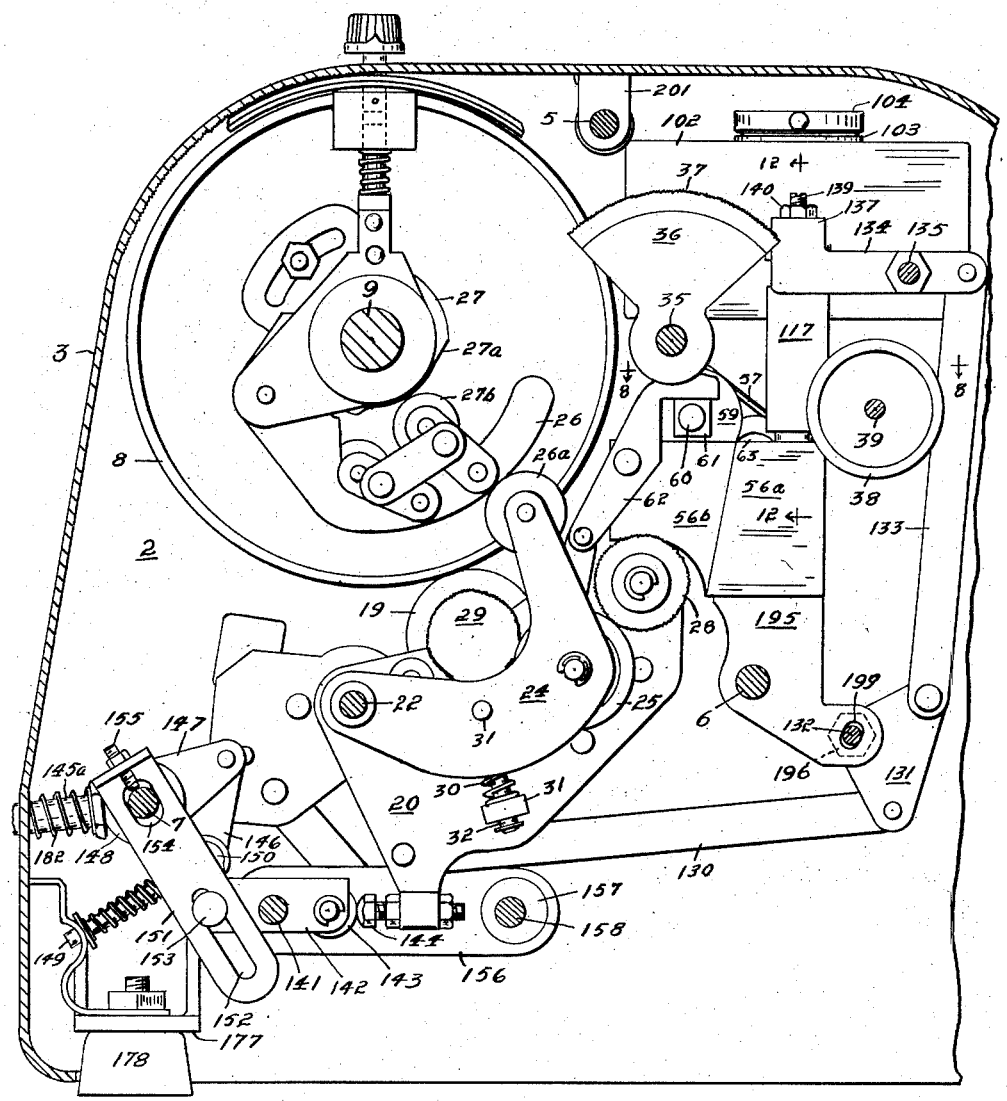

Oct. 21, 1958           H. P. KEIL           2,856,847

LIQUID PROCESS DUPLICATING MACHINE

Filed May 19, 1955           11 Sheets-Sheet 6

INVENTOR.
Henry P. Keil
BY

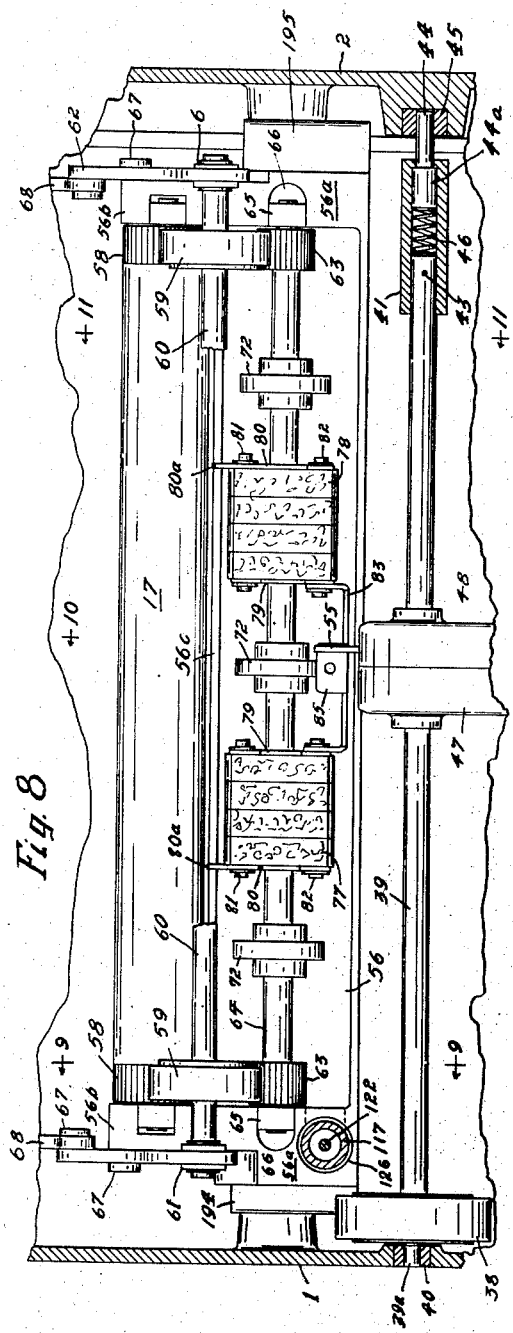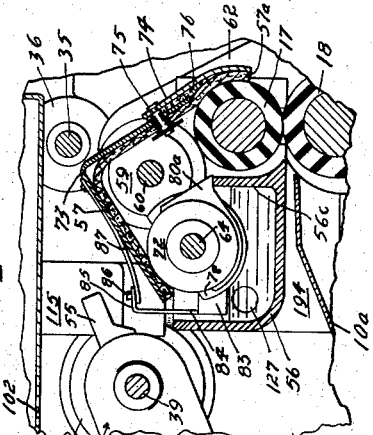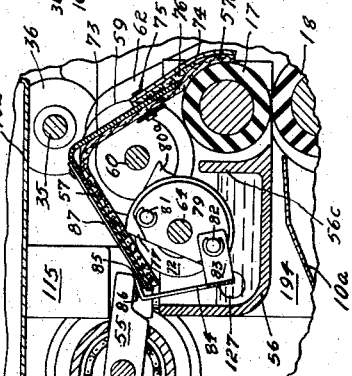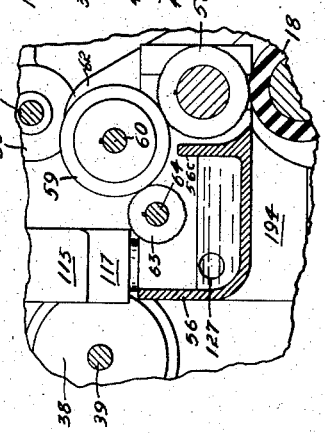

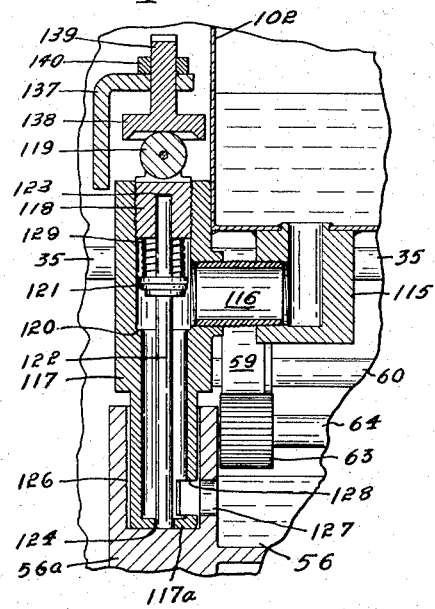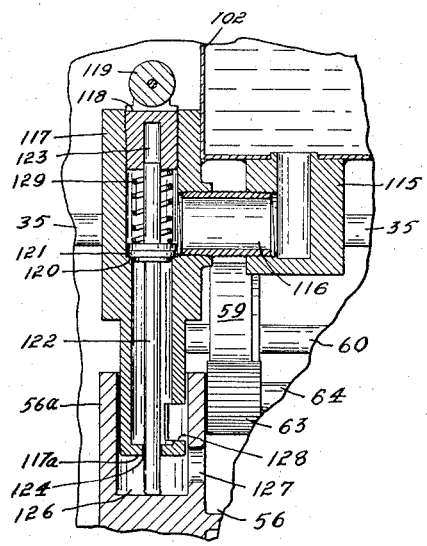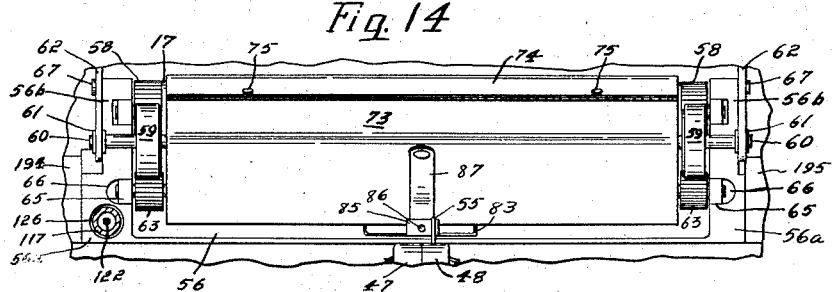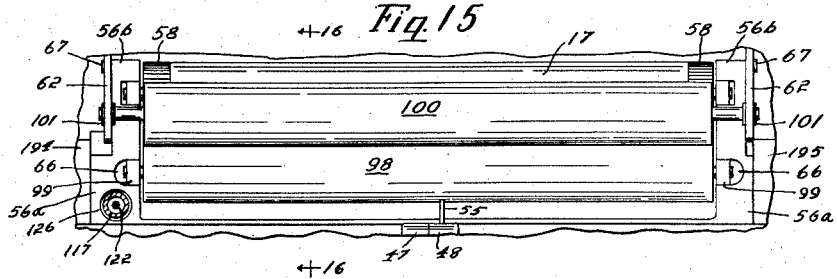

Oct. 21, 1958
H. P. KEIL
2,856,847
LIQUID PROCESS DUPLICATING MACHINE
Filed May 19, 1955
11 Sheets-Sheet 10
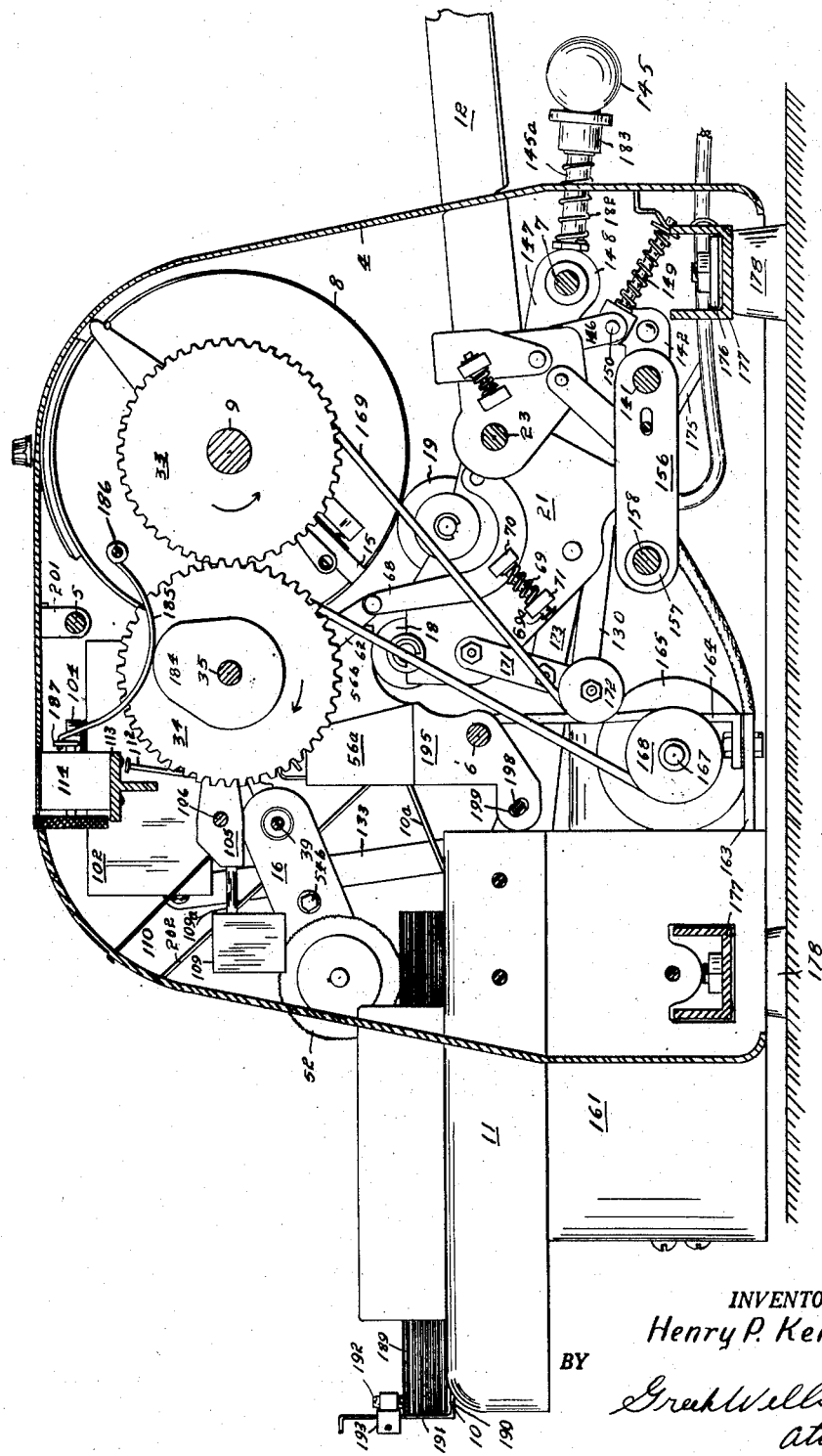
INVENTOR.
Henry P. Keil
BY Oct. 21, 1958        H. P. KEIL        2,856,847
LIQUID PROCESS DUPLICATING MACHINE
Filed May 19, 1955        11 Sheets-Sheet 11
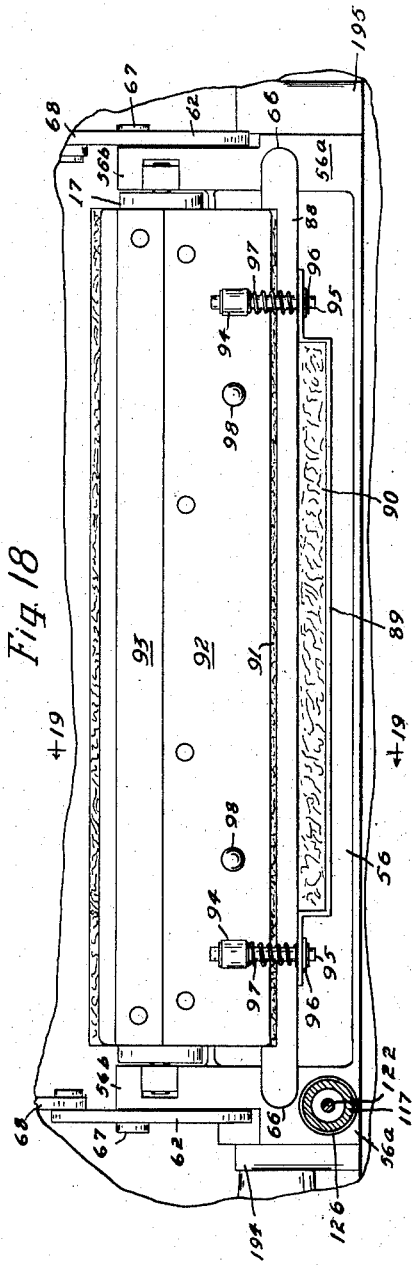
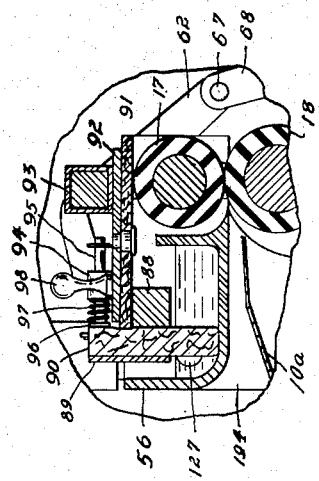
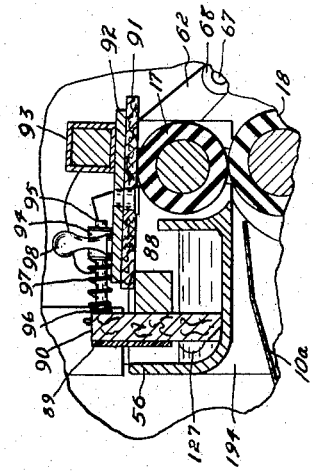
INVENTOR.
Henry P. Keil
BY

United States Patent Office 2,856,847
Patented Oct. 21, 1958

2,856,847

LIQUID PROCESS DUPLICATING MACHINE

Henry P. Keil, Chicago, Ill., assignor to The Fixture Hardware Corporation, Chicago, Ill., a corporation of Illinois Application May 19, 1955, Serial No. 509,547

16 Claims. (Cl. 101—132.5)

My invention relates to improvements in a liquid process duplicating machine. It is a purpose of the present invention to provide a new and improved mechanism for effecting the moistening of copy sheets as they are advanced to engage a master sheet on a rotating drum which may use all roller liquid transfer or wick and roller liquid transfer.

It is an important purpose of my invention to provide an improved wick and roller moistening mechanism wherein the amount of liquid supplied to the wick which wets the moistening roller is automatically proportioned to the length of copy sheet wetted by the roller.

Another purpose of the present invention is to provide a novel wick and roller moistening device in combination with a sealed tank for moistening fluid, and a trough receiving liquid from the tank in which rotating transfer elements operate to transfer liquid to the wick.

It is also a purpose of the present invention to provide a novel liquid supply means for controlling the supply of liquid to the moistening trough and separable sheet feed rollers in combination with a floating tank for liquid and means operable to cut off liquid supply from the tank to the trough whenever the feed rollers are separated.

Other objects and advantages of the invention will appear from the following description and the accompanying drawings illustrating a preferred form of the invention. The drawings and description are illustrative only and are not intended to limit the scope of the invention except as it may be limited by the claims.

In the drawings:

Figure 1 is a plan view of a machine embodying my invention;

Figure 2 is a sectional view taken on the line 2—2 of Figure 1;

Figure 2a is a fragmentary sectional view on the line 2a—2a of Figure 2;

Figure 3 is a sectional view on the line 3—3 of Figure 1;

Figure 4 is a sectional view taken on the line 4—4 of Figure 2;

Figure 5 is an enlarged fragmentary sectional view taken on the line 5—5 of Figure 4, showing the parts in operating position;

Figure 8 is a fragmentary sectional view taken on the line 8—8 of Figure 5 with the wick and its mounting plate removed;

Figure 6:
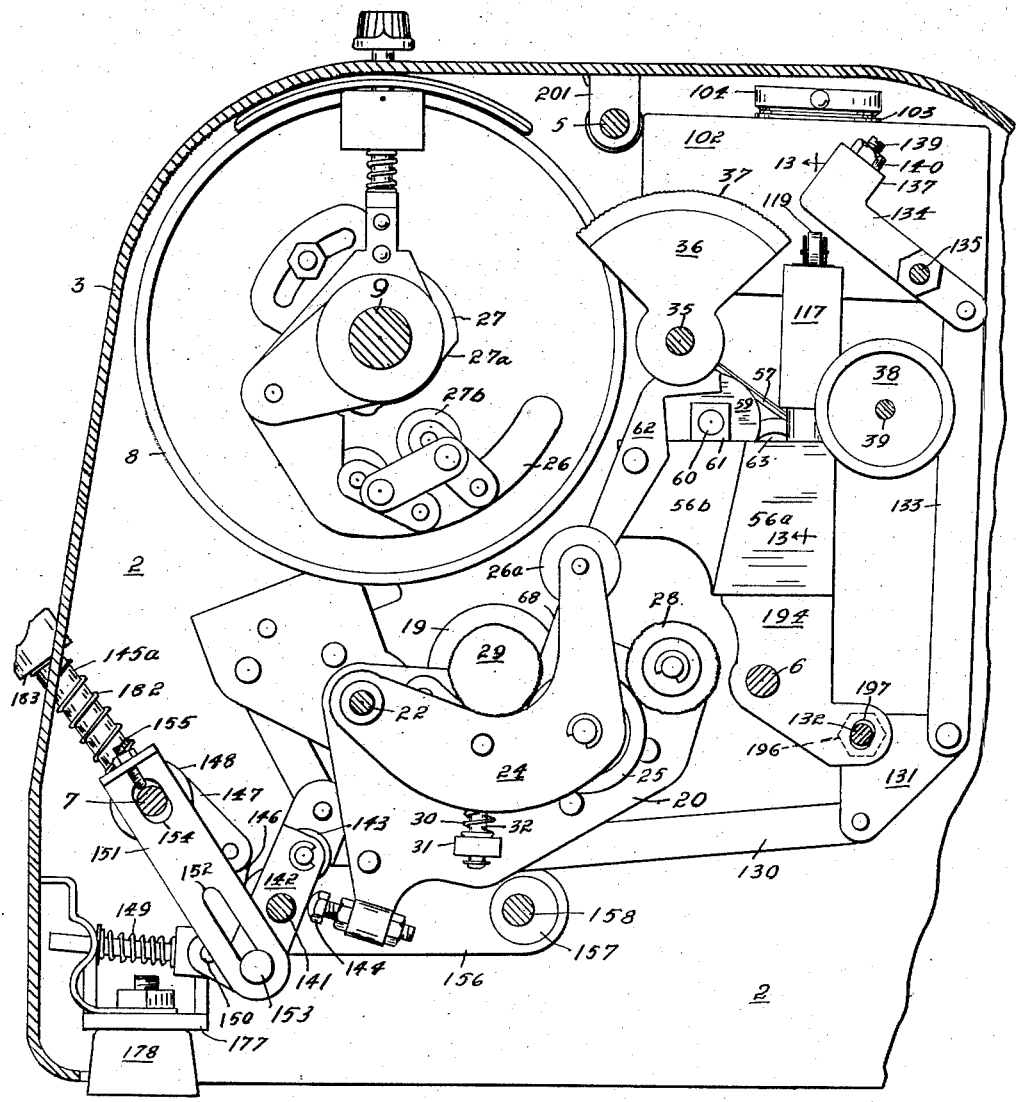
Figure 6 is a view like Figure 5 but with the parts in released or non-operating position.
Figure 7:
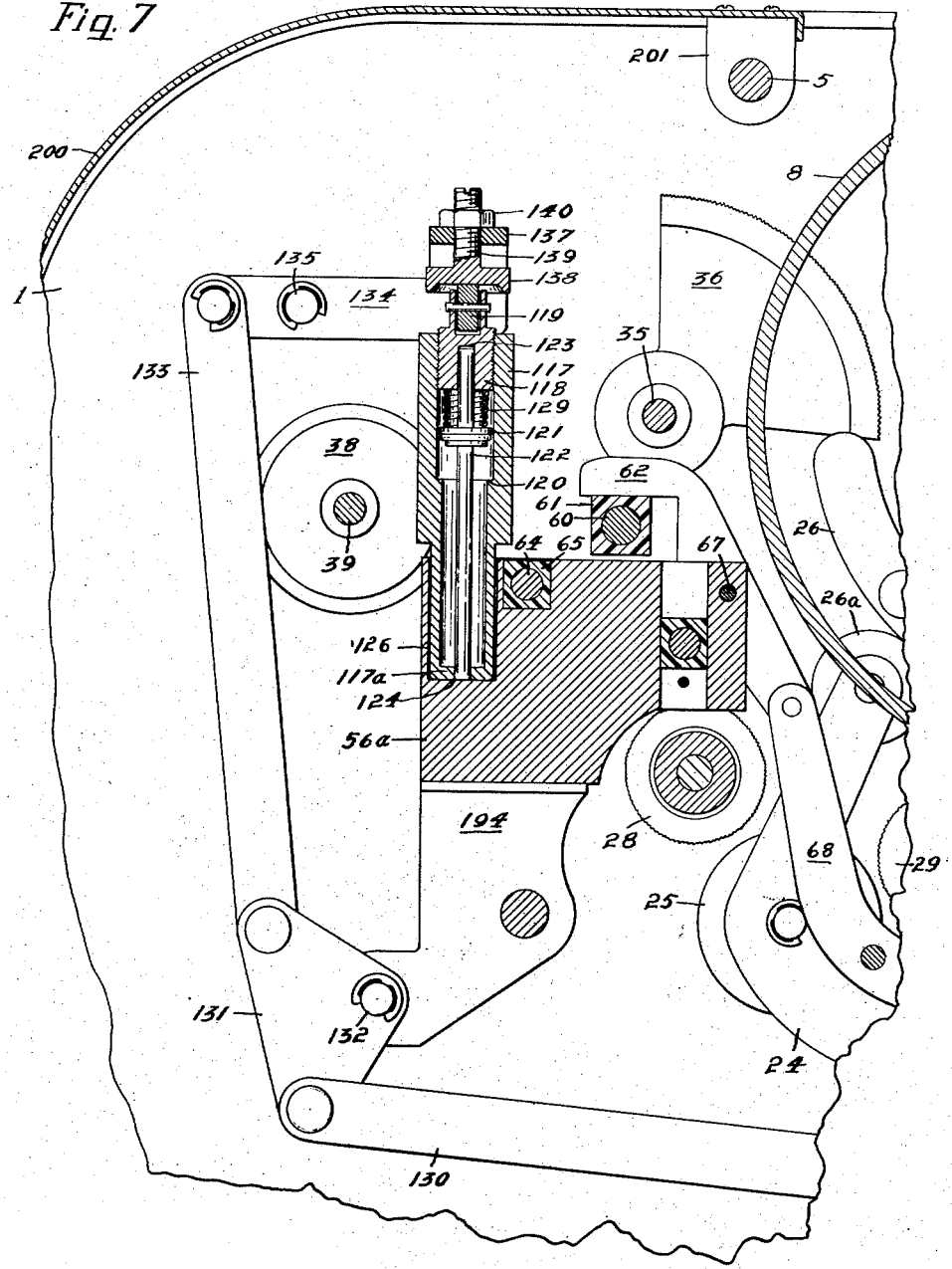
Figure 7 is an enlarged fragmentary sectional view taken on the line 7—7 of Figure 4.

Figures 9, 10 and 11 are sectional views taken on the lines 9—9, 10—10, and 11—11 respectively of Figure 8;

Figure 12 is an enlarged fragmentary sectional view taken on the line 12—12 of Figure 5;

Figure 13 is a view similar to Figure 12 but showing the parts in a changed position;

Figure 14 is a fragmentary plan view of the wick and roller moistening mechanism and associated parts as seen from the line 14—14 of Figure 3;

Figure 15 is a view taken from the same line as Figure 14, but showing moistening rollers substituted for the wick and roller moistening mechanism;

Figure 16 is a sectional view taken on the line 16—16 of Figure 15;

Figure 17 is a sectional view taken on the line 17—17 of Figure 4;

Figure 18 is a fragmentary plan view of a modified wick mechanism;

Figure 19 is a sectional view on the line 19—19 of Figure 18; and

Figure 20 is a view taken on the line 19—19 of Figure 18, showing the parts in changed position.

My invention is shown as embodied in a liquid process duplicating machine. The framework of the machine includes side frames 1 and 2 that are provided with flanges 3 and 4 respectively along their top edges and end edges. The side frames 1 and 2 are connected together by a plurality of cross tie rods 5, 6 and 7. A master sheet drum 8 is supported for rotation by a shaft 9, the ends of which shaft are mounted in the side frames 1 and 2. A copy sheet feed tray 10 is supported at the front of the framework by a bracket 11 that is substantially U-shaped, the ends of the bracket being secured to the side frames 1 and 2. The machine also has a sheet receiving tray 12 that is supported on the cross tie rod 7 and secured beneath the drum by slots 13 in the tray and pins 14 carried by the side frames 1 and 2.

The drum 8 has a master sheet clamp 15 to secure master sheets to the drum. Copy sheets are fed from the tray 10 by a copy sheet feeder 16. The feeder 16 advances the sheets to a pair of rollers 17 and 18. The roller 17 is a moistening roller and the roller 18 is a feed roller. The roller 18 cooperates with the roller 17 to drive it and to advance copy sheets to the drum 8. A platen roller 19 presses the moistened copy sheets against a master sheet on the drum 8.

The platen roller 19 and the roller 18 are carried on lever arms 20 and 21 that are pivotally mounted on stub shafts 22 and 23 respectively. The stub shaft 22 is secured on the side frame 1 and the stub shaft 23 is secured on the side frame 2. The stub shaft 22 also pivots an arm 24 which controls the driving of the roller 18 by the platen roller 19 through the mechanism shown in my prior application, Serial No. 411,981, filed February 23, 1954, for Margin Control Mechanism for Duplicating Machines. The arm 24 has a rubber roller 25 thereon between its ends. The arm 24 also has a cam roller 26a at its free end which engages a cam lever 26 that is adjustable about the axis of the drum 8. The lever 26 is moved toward and away from the drum axis, as the drum rotates, by a cam 27 on the drum 8. The roller 18 has a knurled wheel 28 fixed thereto. The roller 19 has a knurled wheel 29 thereon. The rubber roller 25 engages the wheels 28 and 29 as shown in Figure 5, to drive the roller 18 when the flattened part 27a of the cam 27 is adjacent to a cam roller 27b on the cam lever 26. The arm 24 is urged toward this position by a spring 30 bearing against spring supports 31 on the arms 20 and 24. A guide pin 32 is provided for the spring 30 between the spring supports 31. When the roller 18 is driven from the roller 19, the rollers 18 and 17 will be driven together to advance a copy sheet that is fed to them by the feeder 16.

The feeder 16 is driven from the drum shaft 9 through a gear 33 fixed on the drum shaft 9, a gear 34 fixed on a shaft 35 which has its ends journalled in the side frames 1 and 2. A quadrantal drive segment 36, having its circular face 37 knurled, is fixed on the shaft 35 adjacent to the end of the shaft 35 that is journalled in the side frame 1. The drive segment 36 strikes a rubber wheel 38 that is fixed on a shaft 39 that has a reduced end 39a seated in a bearing 40 in the side frame 1. The other end of the shaft 39 has a sleeve 41 thereon. The sleeve 41 has a slot 42 therein receiving a pin 43 that is fixed in the shaft 39 to provide limited endwise movement of the sleeve 41 on the shaft 39. The sleeve 41 carries a pin 44 that seats in a bearing 45 in the side frame 2. A spring 46 in the sleeve 41 bears on an enlarged head 44a of the pin 44 to keep the pin 44 in the bearing 45. The shaft 39 can be removed by pushing the sleeve 41 endwise on it away from the side frame 2 far enough to remove the pin 44 from the bearing 45 and then to remove the reduced shaft end 39a from the bearing 40.

The copy sheet feeder 16, as shown best in Figures 3 and 4, includes a housing made up of two sections 47 and 48. A sprocket wheel 49 is fixed on the shaft 39 between the housing sections 47 and 48. A shaft 50 is journalled in the housing sections 47 and 48 at their other ends. This shaft 50 carries a sprocket wheel 51 between the housing sections and two sheet feeding, rubber wheels 52 outside the housing sections. A sprocket chain 53 connects the sprocket wheels 49 and 51. The two housing sections 47 and 48 are secured together by a bolt 54 which also secures one end of a finger 55 to the feeder housing. The finger 55 rotatably receives the shaft 39 and projects through the housing section 48 toward the drum 8. The purpose of this finger 55 will be explained hereinafter.

The gears 33 and 34 rotate the shaft 35 once for each rotation of the drum 8. The segment 36 is so positioned on the shaft 35 that it will drive the feeder 16 at the proper time to advance a copy sheet to the rollers 17 and 18 just before the roller 18 is started to rotate. As soon as the segment 36 moves past the wheel 38 the shaft 39 and the feeder wheels 52 are free to rotate as the copy sheet is advanced by the rollers 17 and 18. The copy sheets are guided to the rollers 17 and 18 by a raised portion 10a of the feed tray 10 and the bottom surface of a trough 56 for the liquid used to moisten the copy sheets.

The liquid is supplied to the roller 17 from the trough 56 by a wick means 57 to which the amount of liquid supplied is responsive to the amount of rotation of the roller 17. Since the roller 17 is driven by the roller 18 and this roller is only positively driven by the roller 19 long enough to advance a copy sheet from the rollers 17 and 18 to the roller 19 and the drum 8, the rollers 17 and 18 are thereafter rotated only by the copy sheet as it is drawn between them by the platen roller 19 and the drum 8. Long copy sheets turn the rollers 17 and 18 longer than short sheets. They also take more liquid to moisten them than the short sheets. By making the liquid supply to the wick means 57 responsive to the rotation of the roller 17, overmoistening of the wick is avoided.

The liquid is fed from the trough 56 to the wick means 57 by the mechanism shown in detail in Figures 8 to 11 inclusive. The roller 17 is provided with knurled wheels 58 at its ends. These wheels engage rubber wheels 59 that are fixed on a shaft 60. The shaft 60 has bearings 61 at its ends on which levers 62 bear to hold the wheels 59 in engagement with the wheels 58 and with knurled wheels 63 on a shaft 64. The shaft 64 is carried by bearings 65 that are seated in recesses 66 provided in the ends 56a of the trough 56. The levers 62 are pivoted by pivot pins 67 to extensions 56b of the ends 56a. The levers 62 are operated by arms 68 that are pivoted on the lever arms 20 and 21 that carry the rollers 18 and 19. Springs 69 and guide pins 69a are mounted between spring seats 70 and 71 on the arms 68 and on the lever arms 20 and 21 yieldingly to urge the arms 68 and the levers 62 in the proper direction to hold the wheels 59 down against the wheels 58 and 63. The shaft 64 is rotated, whenever the roller 17 rotates, by the cooperation of the wheels 58, 59 and 63.

The shaft 64 carries a plurality of narrow rollers 72 of noncorrosive metal that are smooth surfaced. These rollers have hubs 73 that can be adjusted endwise along the shaft 64. The rollers 72 are partially immersed in the liquid in the trough 56 and engage the wick 57 so that as they rotate, they carry liquid up to the wick 57. The wick 57 is made of a bibulous material such as felt in which the liquid will spread rapidly by capillary action to reach the portion 57a of the wick that is in engagement with the roller 17. If the rollers 72 are not being rotated, they do not carry any liquid up to the wick 57. They therefore serve to measure the liquid supplied to the wick in accordance with the amount of rotation of the roller 17. The wick is supplied with only the necessary amount of liquid to moisten the copy sheets and is not kept saturated when the machine is not operating.

The wick 57 is carried by a mounting plate 73 which holds the wick in the inverted V-shape shown. The mounting plate 73 has a curved cover strip 74 secured thereon by pins 75. The cover strip 74 and a felt pad 76 mounted with it on the pins 75 provide a backing for the roller engaging portion 57a of the wick 57.

When the machine has been idle for some time the liquid evaporates from the wick 57, leaving it quite dry. In order to prime the wick quickly, I provide a simple novel manually operable mechanism. The shaft 64 is utilized to mount two priming blocks of felt 77 and 78. The blocks 77 and 78 are rotatable upon the shaft 64. The felt blocks 77 and 78 are connected for limited movement in the trough 56 by end plates 79 and 80 at the ends of each block that are held in place by pins 81 and 82. The end plates 80 have portions 80a that normally rest on the wall 56c of the trough 56. A yoke 83 is secured on the pins 82 and has an integral portion 84 that extends upward and has a bent over top portion 85 apertured to receive a pin 86 on a spring arm 87 that is secured to the mounting plate 73. The felt blocks 77 and 78 are segments of cylinders cut away along the top so that normally, when resting in the position shown in Figures 8 and 11, the blocks 77 and 78 do not engage the wick 57. The blocks 77 and 78 do extend into the liquid in the trough 56 so as to be saturated with liquid whenever the trough is supplied with liquid. The blocks 77 and 78 can be turned on the shaft 64, by pressing down on the yoke top portion 85, to the position shown in Figure 10 of the drawings. (In Figure 10 the center roller 72 is left out to show the block 77 and yoke 83 more clearly.) In this position the blocks 77 and 78 are pressed against the wick 57 and transmit liquid to the wick from the trough 56 by capillary action.

The yoke top portion 85 is directly under the finger 55 that is provided on the sheet feeder 16. In order to prime the wick 57, the operator merely lifts the sheet feeder 16 upwardly to turn it about its shaft 39 and bring the finger 55 down on the portion 85. The liquid quickly spreads to the entire wick 57. The sheet feeder 16 can then be lowered and the moistening mechanism is primed for operation.

The mechanism just described provides a means whereby the liquid feed to the copy sheets can be very finely controlled. The rollers 72 can be increased or decreased in number on the shaft 64. The liquid feed to the wick 57 operates only when the roller 17 is rotated. However, the mechanism for controlling the liquid feed to the wick by the rotation of the moistening roller may be greatly varied. An example of a more simple mechanism that accomplishes this without so much refinement is illustrated in Figures 18, 19 and 20. The mechanism shown in Figures 18, 19 and 20 is capable of replacing the shaft 60 and the parts carried thereby and the shaft 64 and the parts carried thereby. As illustrated, the modified mechanism comprises a support bar 88 that is adapted to seat in the recesses 66 of the trough ends 56a. The bar 88 has a wick holding bracket 89, somewhat shorter than the bar, fixed thereon. A wick 90, comprising a strip of felt, is inserted between the bar 88 and the bracket 89. The bracket 89 and the wick 90 both project above the bar 88. Another wick 91 is fastened to a wick mounting plate 92. The wick 91 rides on the roller 17. A weight bar 93 is provided on the plate 92 to give adequate pressure of the wick 91 on the roller 17.

On the plate 92 there are two mounting sleeves 94 for two guide pins 95 that project through the end portions of the bracket 89 above the bar 88. The pins 95 have stop members 96 thereon to keep the pins from being withdrawn from the bracket. Each pin 95 carries a coiled spring 97 which is under compression between the bracket and the corresponding sleeve 94.

The springs 97 are strong enough to keep the wick 91 away from the wick 90 when the roller 17 is not being driven. However, when the roller 17 is rotated by the roller 18 the friction of the wick 91 on the roller 17 overcomes the force of the springs 97 and moves the wick 91 into pressure engagement with the wick 90 as shown in Figure 20. In this position of the wicks 90 and 91, liquid is transferred from the wick 90 to the wick 91 and carried by the wick 91 to the roller 17. As soon as the roller 17 is freed from driving force, the springs 97 move the plate 92 and the wick 91 back to the position shown in Figure 19 to break the liquid path from the wick 90 to the wick 91. Thus the liquid transfer to the wick 91 is governed by the amount of rotation of the roller 17. The roller 17 is rotated whenever a copy sheet is pressed between the rollers 17 and 18. Therefore the liquid feed to the wick 91 and to the roller 17 is proportioned to the demand on the wick 91 for liquid.

To prime the wick 91, the operator can manually move the plate 92 toward the wick 90 to bring the wicks 90 and 91 together long enough to wet the wick 91. The entire wick mechanism can be lifted out of the trough 56 by grasping two knobs 98 that are secured on the plate 92. The levers 62 are not needed with this modification of the wick mechanism.

Both forms of the wick mechanism are readily interchangeable with a roller moistening mechanism as will be evident from the Figures 6, 8 to 11, 14, 15 and 16, and 18 to 20 of the drawings and the following description:

As illustrated in Figure 6, the bearings 61 are released by the levers 62 when the platen roller 19 is moved to the inoperative position shown in Figure 6. This frees the shaft 60 so it can be lifted out with the parts thereon. When the shaft 60 is lifted out, the shaft 64 and the parts carried thereby, can be removed by lifting the shaft 64. The wick 57 and mounting plate 73 rest on the roller 17 and the rollers 72 and are easily lifted off by releasing the pin 86 from the portion 85 of the yoke 84. The modified wick mechanism lifts out readily in one piece. When these parts are removed a fountain roller 98 can be set in the trough 56 with its bearings 99 in the recesses 66. A transfer roller 100 is set on the rollers 17 and 98 with its bearings 101 under the levers 62. (See Figures 15 and 16.)

The trough 56 is supplied with liquid from a container 102 which is mounted over the trough 56 between the side frames 1 and 2. The container 102 has a filling opening 103 in the top thereof which is closed by an air and liquid tight closure 104. The container 102 is supported at its end adjacent to the side frame 2 upon an elongated support member 105 that is pivoted on a stub shaft 106 that is fixed to the side frame 2. The support 105 has a pin 107 thereon at one end thereof and the container has a notched lug 108 thereon that seats on the pin 107. The support 105 carries a weight 109. The weight 109 is mounted on a rod 109a that projects endwise from the end of the support 105 most remote from the pin 107. An indicator 110 is fixed on the member 105 and projects upwardly and forwardly through a slot 111 that is provided in a flange 2a of the side frame 2. A stop member 112 is mounted on the member 105 and extends upward to engage a bracket 113 that is provided on the side frame 2 to support a counting device 114, that counts the drum revolutions. When the amount of liquid in the container 102 reaches a predetermined low level, the weight 109 will overbalance the weight of the container 102 bearing down on the pin 107. This will cause the member 105 to rock on its pivot and move the indicator rod 110 to indicate that the container 102 needs filling. The stop member 112 will limit the upward movement of the container carrying end of the member 105. Downward movement of the container 105 is limited by the stub shaft 106 which projects outwardly beneath the container 105, as shown in Figure 4.

The end of the container 102 nearest to the side frame 1 is provided with an outlet tube 115. A nipple 116 connects this tube to a valve casing 117 which has its upper portion abutting the end of the container. The valve casing 117 is closed at the top by a threaded plug 118 which mounts a roller 119. The casing 117 has a valve seat 120 for a valve 121. The valve 121 is fixed on a stem 122. The upper end of the stem 122 is guided by a recess 123 in the plug 118. The lower end of the stem 122 is guided by an aperture 124 in the bottom 117a of the casing 117. The lower end of the stem 122 seats in a well 126 which is provided in the end 56a of the trough 56. The casing 117 is reduced in exterior size for a distance above the bottom 117a so it can move freely up and down in the well 126. The well 126 is connected to the main part of the trough 56 by a passage 127. The valve casing has an outlet aperture 128 which aligns with the passage 127 when the casing bottom 117a is seated at the bottom of the well 126. This is the normal operating position of the parts 117 to 128. A coiled spring 129 is interposed between the plug 118 and the valve 121. The spring is under compression and will lift the valve casing and the container 102 to the position shown in Figure 13 to seat the valve 121 on the valve seat 120 unless downward pressure is applied on the casing 117 in addition to the weight of the container and its filling of liquid. When the valve 121 is closed then, of course, no liquid can escape from the container 102.

The mechanism for applying added pressure on the valve casing 117 to open the valve 121 and allow liquid to flow into the lower part of the casing 117 and into the trough 56 is shown best in Figures 4, 5, 6 and 7. A link 130 has one end pivoted on the lever arm 20. This link 130 is connected to a bell crank plate 131 which is pivoted upon a stub shaft 132 mounted on the side frame 1. An upwardly extending link 133 is pivoted to the plate 131 so that movement of the link 130 by the shifting of the lever arms 20 to the copying position shown in Figure 5, from the idle position shown in Figure 6, will move the link 133 upward. The upper end of the link 133 is pivoted to a lever 134. The lever 134 is pivoted upon a stub shaft 135 on the side frame 1. The lever 134 and the link 133 are laterally offset from each other at their pivotal connection by a spacer 136. The lever 134 has an offset portion 137 at its free end. This portion 137 extends toward the container 102 and over the roller 119 at the top of the valve casing 117. A roller engaging head 138 has a stem 139 threaded into the portion 137 and is locked in place by a lock nut 140.

The construction just described provides means to apply pressure on the valve casing 117 to depress it and move the valve seat 120 down away from the valve 121 against the force of the spring 129. This opens a passage from the container 102 to the trough 56 through the tube 115, the nipple 116, the valve casing 117 and the apertures 127 and 128. Liquid can flow through this passage until it rises high enough in the trough 56 and the well 126 to cut off ingress of air to the interior of the valve casing 117. Since the container 102 is sealed air tight, the vacuum created in it after air ingress is cut off at 127 and 128 will enable the atmospheric air pressure to prevent further liquid flow from the container 102 into the trough 56. When enough liquid has been used from the trough 56 to again expose the apertures 127 and 128, more air is let into the container 102, and more liquid flows into the trough 56.

The well 126 is larger in diameter than the lower portion of the valve casing 117 so that the up and down movement of the container 102 at its weight balanced end can take place without binding the valve casing 117 in the well 126. Whenever the rollers 18 and 19 are moved down away from the moistening roller 17 and the drum 8 respectively, as shown in Figure 6, the means connecting the lever arm 20 to the head 138 lifts the head 138 and allows the spring 129 to raise the valve casing 117 and the container 102 to the position shown in Figure 13. This seats the valve 121 and cuts off further liquid feed to the trough 56.

The mechanism for raising and lowering the lever arms 20 and 21 is a known mechanism. It comprises a shaft 141 which has two trip levers 142 thereon, each provided with a roller 143 that engages an adjustable stop member 144 on the lever arm 20 or 21. The shaft 141 is turned by a handle 145 which is connected (see Figure 2) to one of the trip levers 142. The connection is by a link 146 from the lever 142 to an arm 147 journalled on the cross rod 7. The hub 148 of the arm 147 carries the handle 145. An over-center spring guide pin 149 is pivoted to the link 146 at 150 where it connects to the lever 142. This connection from the trip levers 142 to the handle 145 is essentially the same as that shown in my prior Patent No. 2,622,519, dated December 23, 1953. In order to keep the trip levers 142 from swinging too far when they are tripped to let the roller 19 move away from the drum, I provide a link 151 from the rod 7 to the trip lever 142 that is most remote from the handle 145. This link 151 has a lost motion connection to the trip lever 142, which is provided by a long slot 152 in the link 151 and a pin 153 on the trip lever. An elongated aperture 154 in the link 151 receives the rod 7. The link has an adjustable threaded pin 155 riding on the rod 7 for adjustment of the amount the pin 153 can move away from the rod 7.

The shaft 141 is carried by two links 156 which are adjustable endwise by eccentrics 157 that are mounted on a shaft 158 that extends from the side frame 1 through the side frame 2 and is provided with a hand lever 159 to adjust the pressure of the rollers 18 and 19 as described in my application, Serial No. 296,283, filed June 30, 1952, for Pressure Control for Duplicating Machines. Since this mechanism forms no part of the present invention it will not be described further.

The machine is adapted for either manual or motor operation. The motor and its connections are illustrated in Figures 2, 4 and 17. They have been left off in Figures 5 and 6 for clearness. For motor operation a motor 160 is mounted beneath the feed tray 10. A shell 161 is bolted to the bracket 11. This shell has brackets 162 that support two motor mounting bars 163 at one end. The other ends of the bars 163 are suspended from the cross rod 6 by hangers 164. The motor 160 carries a gear box 165 into which the shaft 166 of the motor extends. A cross shaft 167 is driven by the shaft 166 and carries a pulley 168. The pulley 168 drives a belt 169 which, in turn, drives a pulley 170 which is secured on the shaft 9 of the drum 8. The lever arm 21 carries a bar 171 that supports an idler pulley 172. The bar is braced by another bar 173 that is secured to the bar 171 and to the lever arm 21. The pulley 172 swings downward away from the belt 169 when the lever arm 21 is lowered to move the roller 19 away from the drum 8. This relieves the tension on the belt 169 when the rollers 18 and 19 are in inoperative position.

The motor is controlled by a switch 174 that is mounted on a bracket 175. The bracket 175 is bolted to a cross bar 176 extending between the foot brackets 177 at the rear of the machine. The brackets 177 mount rubber feet 178 to the side frames 1 and 2. The switch 174 is a well known micro switch having a push button 180. A cam 181 is fixed on the shaft 141 and is so arranged as to press the button 180 inward to close the switch 174 when the trip levers 142 are lowered all the way to the position shown in Figure 2 so that the rod portion 145a of the handle 145 rests at the bottom of a recess 4a that is cut in the flange 4 of the side wall 2.

In starting the machine it is necessary to have liquid in the trough 56 and to prime the wick 57 or 91. In order to get liquid into the trough 56, the valve 121 has to be lifted from its seat to let the liquid flow from the container 102 through the valve casing 117 into the trough 56. Pressure must be applied to the valve casing to lower it. The handle 145 as shown, is provided with a means to cause application of the pressure without starting the motor. A light coiled spring 182 is provided on the portion 145a of the handle 145 between the hub 148 and a sleeve 183 that is slidable on the portion 145a. Normally the sleeve 183 is held out in the position shown in Figures 2 and 17. However, it can be pushed in against the spring 182 to seat in the recess 2r to keep the handle 145 from moving down all the way. This slight elevation of the handle 145 is enough to prevent the cam 181 from moving the button 180 in far enough to close the switch 174. Yet in this position of the handle 145, the lever arm 21 and the means connecting it with the head 138, have been moved far enough to open the valve 121 and allow the liquid to flow into the trough 56. When the priming is completed, the operator can move the sleeve 183 back to its normal position and the handle 145 will move down far enough to close the switch 174.

The counter 114 is operated in a simple but effective manner from the shaft 35 which is connected by the gears 33 and 34 with the drum shaft 9. The shaft 35 carries a cam 184. An operating arm 185 for the counter is pivoted to the side frame 2 by a pin 186 and has its other end connected at 187 to the counter mechanism. The cam 184 lifts the operating arm 185 once each time the gears 33 and 34 rotate and they make one rotation for each rotation of the drum.

For manual rotation of the drum it is only necessary to connect a handle to the shaft 35. The shaft 35 is shown as provided with a round handle 188 in Figure 1. When the operator wants to turn the drum by hand, he can use the sleeve 183 to deenergize the motor 160 and then proceed to turn the handle 188.

The copy sheet feed tray 10 has an end stop bar 190 slidably mounted and frictionally held therein. This bar has an upright portion 191 adapted to abut the rear end of a stack of copy sheets indicated at 189. I have found that I can improve the feeding of sheets from the stack 189 by using a block 192 of sponge rubber resting on the sheets and a weight 193 fixed to the block 192 and slidable upon the portion 191.

The trough 56 is supported on the cross rod 6 by two brackets 194 and 195. (See Figures 4, 5 and 17.) The bracket 194 is secured to the side frame 1 by the stub shaft 132. This stub shaft has a hexagonal portion 196 that clamps the bracket 194 to the side frame 1. The stub shaft 132 is threaded into the side frame 1. The bracket 194 has an elongated aperture 197 that permits slight adjustment of the trough 56 about the cross rod 6 in assembling the machine. The bracket 195 is secured to the side frame 2 by a screw bolt 198 that is threaded into the side frame 2. This bracket also has an elongated aperture 199 that permits slight adjustment of the trough 56.

The copy sheet moistening mechanism is covered by a removable cover 200 that has brackets 201 thereon which pivot it on the cross rod 5. The cover has its front portion 202 extended to the trough 56 and cut out at 203 to provide room for the sheet feeder 16 to move up and down. The front portion 202 of the cover 200 also provides means for holding the sheet feeder 16 raised for inserting copy sheets and for priming the wick 57. This means is illustrated best in Figures 2, 2a and 3. As shown, the front portion 202 has two spring clips 204 and 205 mounted thereon in position to engage the head 54a and cap nut 54b of the bolt 54. The spring clips 204 and 205 each have two recesses 206 and 207 that are adapted to receive and hold the head and nut when the sheet feeder is lifted. The lower recesses 206 hold the sheet feeder high enough to permit insertion of a stack 189 of copy sheets but not high enough to bring the finger 55 down far enough to cause priming of the wick 57. The recesses 207 hold the feeder 16 high enough to cause the finger 55 to move the priming blocks 77 and 78 against the wick 57. Since the priming sometimes takes as much as two minutes, this enables the operator to do the priming of the wick without manually holding the feeder 16 at the proper position.

It is believed that the detailed construction of a duplicating machine embodying my invention will be understood from the foregoing description. The construction is such that the operator can utilize wick moistening for making copies where this method of moistening is desired, for example, when several hundred copies are desired from a master and they need not be very bright. Then the operator can shift quickly to all roller moistening by removing the wick mechanism and inserting the fountain roller and transfer roller. The particular means whereby the liquid feed to the wick is carried out only when the moistening roller is turning provides accurate control of the wick saturation in proportion to the length of copy sheet being moistened, because the roller 17 turns only when a copy sheet is being advanced by it. The manner of controlling the supply of liquid to the trough 56 from the container conserves liquid, particularly where the machine is idle frequently for several hours at a time. The only liquid lost by evaporation while the machine is left idle, is the small amount left in the trough when the machine is put in inoperative condition.

Having thus described my invention, I claim:

1. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and rollers, a wick bearing on the moistening roller, a liquid trough, an upstanding wick mounted in the trough; yielding means holding the first named wick spaced from the wick mounted in the trough, the moistening roller being operably connected to one of the wicks to move the wicks into engagement upon rotation of the moistening roller in a direction to advance a copy sheet.

2. A duplicating machine comprising a supporting frame, a master sheet drum rotatably mounted in said frame, a pair of lever arms pivoted in said frame below the ends of the drum, a platen roller beneath the drum carried by said lever arms and movable by said lever arms into and out of pressure engagement with the drum, a liquid containing trough supported by said frame alongside and parallel to the drum, a copy sheet moistening roller carried by said trough, an elongated liquid supply container above the trough having one end supported on the trough and the other end supported on said frame, a copy sheet feeding roller carried by said lever arms and movable thereby upward against the moistening roller when the platen roller is moved upward against the drum, means in the trough operable by rotation of the moistening roller to transfer liquid to the moistening roller, an upright valve casing having its upper portion open to the container and having a side aperture at its lower end in the trough, a valve seat in the casing above said aperture, a valve above the seat and movable toward and away from the seat, a stem for said valve having a lower end portion extending through the valve casing at its bottom to rest on the trough, spring means in the casing over said valve operable to support the valve casing and container raised so that the valve is closed, a head to apply downward pressure to the valve casing to open the valve and link and lever means connecting said head to one of said lever arms operable to move the head down as the platen roller is moved up by the lever arms.

3. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and rollers, a wick bearing on the moistening roller, a liquid trough having liquid therein, the moistening roller being spaced from the liquid, a wick priming device in the trough, a copy sheet feeder operable to feed a sheet to the feeding and moistening rollers, and having means thereon for operating the wick priming device, and means operable by rotation of said moistening roller to transfer liquid from the trough to the wick.

4. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and rollers, a wick bearing on the moistening roller, a liquid trough, an upstanding wick mounted in the trough; yielding means holding the first named wick spaced from the wick mounted in the trough, the first named wick having a cover plate over it and secured to it, a bar carrying the upstanding wick and extending beneath the first named wick and guiding it toward and away from the upstanding wick, the moistening roller being operably connected to one of the wicks to move the wicks into engagement upon rotation of the moistening roller in a direction to advance a copy sheet.

5. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, and means to drive said drum and rollers, the improvement for supplying liquid to the moistening roller comprising a liquid trough having liquid therein, the moistening roller being spaced from the liquid in the trough, a wick bearing against said moistening roller, said wick being spaced from the liquid in the trough, non-absorbent roller means in the trough and engaging the wick, and said non-absorbent roller means being drivingly connected to the moistening roller to rotate upon rotation of the moistening roller whereby to transfer liquid from the trough to the wick.

6. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, and means to drive said drum and rollers, the improvement for supplying liquid to the moistening roller comprising a liquid trough having liquid therein, the moistening roller being spaced from the liquid in the trough, a wick bearing against said moistening roller, said wick being spaced from the liquid in the trough, non-absorbent roller means in the trough and engaging the wick, and said non-absorbent roller means being drivingly connected to the moistening roller to rotate upon rotation of the moistening roller whereby to transfer liquid from the trough to the wick, and a wick priming device in the trough.

7. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, and means to drive said drum and rollers, the improvement for supplying liquid to the moistening roller comprising a liquid trough having liquid therein, the moistening roller being spaced from the liquid in the trough, an upstanding wick mounted in the trough, a second wick, yielding means holding the second wick spaced from the upstanding wick, and the second wick being frictionally engaged with the moistening roller whereby to move against the upstanding wick upon rotation of the moistening roller in a direction to advance a copy sheet.

8. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, and means to drive said drum and rollers, the improvement for supplying liquid to the moistening roller comprising a liquid trough having liquid therein, the moistening roller being spaced from the liquid in the trough, an upstanding wick mounted in the trough, a second wick, yielding means holding the second wick spaced from the upstanding wick, the second wick having a cover plate over it and secured to it, a bar carrying the upstanding wick and extending beneath the second wick and guiding it toward and away from the upstanding wick, and the second wick being frictionally engaged with the moistening roller whereby to move against the upstanding wick upon rotation of the moistening roller in a direction to advance a copy sheet.

9. In a duplicating machine having a drum adapted to receive a master sheet, a platen roller adapted to press the copy sheets against the drum, means to move said platen roller toward and away from the drum, a copy sheet feeding roller and a copy sheet moistening roller adapted to engage a copy sheet and advance it to the drum and platen roller, a liquid trough, and means to transfer liquid from the trough to the moistening roller, the improvement comprising a liquid supply container positioned above the trough, an upright valve casing having its upper portion open to the container and having a side aperture at its lower end in the trough, a valve seat in the casing above said aperture, a valve above the seat and movable toward and away from the seat, a stem for said valve having a lower end portion extending through the valve casing at its bottom to rest on the trough, spring means in the casing over said valve operable to support the valve casing and container raised so that the valve is closed, a head to apply downward pressure to the valve casing to open the valve and link and lever means connecting said head to said platen roller moving means operable to move the head down as the platen roller is moved up by the lever arms.

10. In a duplicating machine, the combination with a liquid supply trough of a liquid supply container above the trough, an upright valve casing connected to the container and being open to the container and having its lower end positioned in the trough, an aperture in the casing adjacent the lower end thereof, a valve seat in the casing above said aperture, a valve in the casing, said valve being moveable toward and away from the valve seat, a stem on said valve extending through the bottom of the casing and engaged with the trough, the container being moveable upwardly and downwardly with respect to the trough whereby to move the valve seat toward and away from the valve, and means operable to move the container toward and away from the trough to open and close the valve.

11. In a duplicating machine including a supporting frame, a master sheet drum rotatably mounted in said frame, a pair of lever arms pivoted in the frame, a platen roller carried by said arms and movable by movement of said arms into and out of engagement with the drum, a liquid supply trough mounted on said frame, and copy sheet moistening means connected with the trough, the improvement in means for supplying liquid to the trough during operation of the machine comprising a liquid supply container above the trough, an upright valve casing connected to the container and being open to the container and having its lower end positioned in the trough, an aperture in the casing adjacent the lower end thereof, a valve seat in the casing above said apertures, a valve in the casing, said valve being moveable toward and away from the valve seat, a stem on said valve extending through the bottom of the casing and engaged with the trough, the container being moveable upwardly and downwardly with respect to the trough whereby to move the valve seat toward and away from the valve, and means connected to one of the platen roller carrying arms operable to move the container in a direction to disengage the valve from the valve seat when the platen roller is moved into engagement with the drum.

12. In a duplicating machine including a supporting frame, a master sheet drum rotatably mounted in said frame, a pair of lever arms pivoted in the frame, a platen roller carried by said arms and movable by movement of said arms into and out of engagement with the drum, a liquid supply trough mounted on said frame, and copy sheet moistening means connected with the trough, the improvement in means for supplying liquid to the trough during operation of the machine comprising a liquid supply container above the trough, an upright valve casing connected to the container and being open to the container and having its lower end positioned in the trough, an aperture in the casing adjacent the lower end thereof, a valve seat in the casing above said apertures, a valve in the casing, said valve being movable toward and away from the valve seat, a stem on said valve extending through the bottom of the casing and engaged with the trough, the container being movable upwardly and downwardly with respect to the trough whereby to move the valve seat toward and away from the valve, and means connected to one of the platen roller carrying arms operable to move the container in a direction to engage the valve with the valve seat when the platen roller is moved away from the drum.

13. In a duplicating machine including a supporting frame, a master sheet drum rotatably mounted in said frame, a pair of lever arms pivoted in the frame, a platen roller carried by said arms and movable by movement of said arms into and out of engagement with the drum, a liquid supply trough mounted on said frame, and copy sheet moistening means connected with the trough, the improvement in means for supplying liquid to the trough during operation of the machine comprising a liquid supply container above the trough, an upright valve casing connected to the container and being open to the container and having its lower end positioned in the trough, an aperture in the casing adjacent the lower end thereof, a valve seat in the casing above said apertures, a valve in the casing, said valve being movable toward and away from the valve seat, and means connected to one of the platen roller carrying arms, operable to move the valve toward and away from the valve seat whereby to open the valve when the platen roller is moved into engagement with the drum and to close the valve when the platen roller is moved away from the drum.

14. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and rollers, a wick bearing on the moistening roller, a liquid trough having liquid therein, the moistening roller being spaced from the liquid, means extending into the liquid in the trough normally inoperable to transfer liquid from the trough to the wick, and means actuated by rotation of the moistening roller to cause the means extending into the trough to transfer liquid from the trough to the wick.

15. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and rollers, a wick bearing on the moistening roller, a liquid trough beneath the wick having liquid therein, the moistening roller being spaced from the liquid, means extending into the liquid in the trough normally inoperable to transfer liquid from the trough to the wick, and means actuated only by rotation of the moistening roller in a direction to advance a copy sheet to the drum to cause said means extending into the trough to transfer liquid from the trough to the wick.

16. In a duplicating machine having a drum adapted to receive a master sheet, a platen roller adapted to press copy sheets against the drum, a copy sheet feeding roller and a copy sheet moistening roller adapted to engage a copy sheet and advance it to the drum and platen roller, means to drive said drum and roller, a wick bearing on the moistening roller, a liquid trough having liquid therein, the moistening roller being spaced from the liquid, a wick priming device in the trough operable only upon actuation to transfer liquid to the wick, manually operable means on the machine to actuate said priming device and cause it to transfer liquid to the wick, and means independent of said priming device operable by rotation of said moistening roller to transfer liquid from the trough to the wick.

References Cited in the file of this patent

UNITED STATES PATENTS

| | | |
|---|---|---|
| 2,171,061 | Ford | Aug. 29, 1939 |
| 2,185,682 | Pittman | Jan. 2, 1940 |
| 2,231,639 | Ritzerfeld | Feb. 11, 1941 |
| 2,237,548 | Copeland | Apr. 8, 1941 |
| 2,278,197 | Gilbert | Mar. 31, 1942 |
| 2,534,422 | Ditty | Dec. 19, 1950 |
| 2,597,804 | Keil | May 20, 1952 |
| 2,720,216 | Scully | Oct. 11, 1955 |